(12) United States Patent
Koseoglu et al.

(10) Patent No.: US 11,124,717 B1
(45) Date of Patent: Sep. 21, 2021

(54) HYDROPROCESSING UNITS AND METHODS FOR PREVENTING CORROSION IN HYDROPROCESSING UNITS

(71) Applicant: Saudi Arabian Oil Company, Dhahran (SA)

(72) Inventors: Omer Refa Koseoglu, Dhahran (SA); Ata Can Koseoglu, Dhahran (SA); Anas Farkad Alkhani, Riyadh (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/820,312

(22) Filed: Mar. 16, 2020

(51) Int. Cl.
| C10G 75/00 | (2006.01) |
| B01J 19/02 | (2006.01) |
| C10G 47/00 | (2006.01) |
| C10G 45/02 | (2006.01) |

(52) U.S. Cl.
CPC .............. *C10G 75/00* (2013.01); *B01J 19/02* (2013.01); *C10G 45/02* (2013.01); *C10G 47/00* (2013.01); *B01J 2219/0204* (2013.01)

(58) Field of Classification Search
None
See application file for complete search history.

(56) References Cited

U.S. PATENT DOCUMENTS

| 9,193,879 | B2 | 11/2015 | Chakraborty et al. |
| 9,656,229 | B2 | 5/2017 | Bedard et al. |
| 9,707,530 | B2 | 7/2017 | Bedard et al. |
| 2010/0203340 | A1 | 8/2010 | Ruoff et al. |
| 2014/0261998 | A1* | 9/2014 | Veerasamy ............. C23C 26/00 156/247 |

(Continued)

FOREIGN PATENT DOCUMENTS

| CN | 204051658 U | 12/2014 |
| CN | 107034498 A | 8/2017 |

(Continued)

OTHER PUBLICATIONS

Koehler, Fabian M., et al. "Selective chemical modification of graphene surfaces: distinction between single-and bilayer graphene." Small 6.10 (2010). 20 pages.

(Continued)

*Primary Examiner* — Tam M Nguyen
(74) *Attorney, Agent, or Firm* — Leason Ellis LLP

(57) ABSTRACT

Methods for operating a hydroprocessing reactor and preventing corrosion in a hydroprocessing unit are provided. The hydroprocessing reactor includes surfaces exposed to corrosive compounds. In one aspect, a graphene-based coating is applied to the surfaces of the reactor. A feed comprising crude oil or its fractions and hydrogen is introduced into the reactor, and the operating temperature of the reactor is increased to 36° C.-600° C. The reactor is operated at a pressure of 10 bar-250 bar. The feed is then hydroprocessed in the reactor and the coating defines a barrier on the surfaces of the reactor to prevent corrosion. In another aspect, after application of the coating, the coated surface is tested to determine whether the coating covers the entire surface. Additional coating is then applied to one or more areas of the surface that were determined not to be covered by the initial coating.

18 Claims, 5 Drawing Sheets

(56) References Cited

U.S. PATENT DOCUMENTS

| | | | | |
|---|---|---|---|---|
| 2014/0308523 A1* | 10/2014 | Veerasamy | ........... | C01B 32/186 |
| | | | | 428/408 |
| 2015/0064451 A1* | 3/2015 | Kalaga | ..................... | B05D 1/28 |
| | | | | 428/336 |
| 2018/0250704 A1* | 9/2018 | Truica-Marasescu | ........................ | |
| | | | | C01B 32/184 |
| 2019/0315939 A1* | 10/2019 | Rogojina | ................. | C08K 9/02 |
| 2020/0263285 A1* | 8/2020 | Stowell | ................... | C23C 4/067 |
| 2021/0040333 A1* | 2/2021 | Ijeri | ......................... | C09D 5/24 |
| 2021/0053829 A1* | 2/2021 | Tanner | ................... | B01J 19/126 |

FOREIGN PATENT DOCUMENTS

| | | |
|---|---|---|
| CN | 110670052 A | 1/2020 |
| WO | 2018085988 A1 | 5/2018 |

OTHER PUBLICATIONS

Kalita, Golap, and Masaki Tanemura. "Fundamentals of Chemical Vapor Deposited Graphene and Emerging Applications." Graphene Materials-Advanced Applications (2017). pp. 41-66.

Duan, Zhe. "Application of graphene in metal corrosion protection." IOP Conference Series: Materials Science and Engineering. vol. 493. No. 1. IOP Publishing, 2019.

International Search Report and Written Opinion in Corresponding PCT Application No. PCT/US2021/022300 dated Jun. 18, 2021. 11 pages.

\* cited by examiner

FIG. 2

| Material | Relative Cost |
|---|---|
| Carbon Steel | 1 |
| 3 - ½ Nickel | 1.45 |
| 1 Cr - ½ Mo | 2.1 |
| 1 - ¼ Cr - ½ Mo | 2.65 |
| 2 - ¼ Cr - 1 Mo | 2.8 |
| 5 Cr - ½ Mo | 3.5 |
| 9 Cr - 1 Mo | 6.25 |
| 304 SS | 3.9 |
| 316 SS | 6.5 |
| 321 SS | 7.5 |
| 347 SS | 9.5 |
| Monel | 13.5 |
| Inconel 600 | 12 |
| Admiralty | 3.75 |

HYDROPROCESSING UNITS AND METHODS FOR PREVENTING CORROSION IN HYDROPROCESSING UNITS

TECHNICAL FIELD

The present disclosure is generally related to methods for coating surfaces and, more particularly, is related to methods for coating a metal surface of a hydroprocessing unit with a graphene-based coating, thereby producing an improved hydroprocessing unit that prevents corrosion and has an extended life cycle.

BACKGROUND OF THE DISCLOSURE

Hydrotreating and hydrocracking process technologies (commonly called "hydroprocessing") are used commercially in various petroleum refineries. Hydroprocessing is a process that includes removing unwanted impurities, such as sulfur and nitrogen, from the crude oil fractions with hydrogen in the presence of a catalyst to produce clean transportation fuels or prepare feedstock for other refining processes. Hydroprocessing is applied to a variety of feeds from naphtha to residual oils. Hydrotreating and hydrocracking process technologies generally require high hydrogen partial pressures, resulting in high-pressure equipment, such as exchangers, reactors, separators, and the like. The metal used in the high-pressure equipment depends on the design, the temperature to be used, and the pressures within the equipment.

Conventionally, various stainless steel and chromium-molybdenum (Cr—Mo) steel alloys with varying metal ratios are used for the hydroprocessing equipment. However, these metals and metal alloys can still be susceptible to corrosion, which then requires replacement of the process equipment to ensure safe hydroprocessing operations. While portion of the equipment can sometimes include protective cladding, the protective cladding can only extend the life of the processing equipment for a limited time.

These and other challenges are addressed by the methods and apparatuses of the present application.

SUMMARY OF THE DISCLOSURE

In a first aspect, a method of operating a hydroprocessing reactor is provided, in which the reactor comprises surfaces exposed to corrosive compounds. In this first aspect, a graphene-based coating is applied to the surfaces of the reactor. A feed comprising crude oil or its fractions and hydrogen is then introduced into the reactor. An operating temperature of the reactor is increased to a temperature in the range of 36° C.-600° C., and the reactor is operated in a pressure range of 10 bar-250 bar. The feed in the reactor is then hydroprocessed, and the graphene-based coating defines a barrier on the surfaces of the reactor that prevents corrosion.

In another aspect, the graphene-base coating is chemically or photochemically modified such that the graphene-based coating is stabilized and functionalized on the surfaces of the reactor.

In another aspect, the corrosion comprises one or more of: hydrogen embrittlement, high temperature hydrogen attack, temper embrittlement, high temperature $H_2S$ corrosion, polythionic acid cracking, and ammonium bisulfide corrosion.

In another aspect, the graphene-based coating is applied to the surfaces of the reactor via a metallurgical process. In another aspect, the graphene-based coating comprises a layer of graphene and a layer of cladding.

In a second aspect, a method for preventing corrosion in a hydroprocessing unit is provided. In this second aspect, a coating is applied to a surface of the hydroprocessing unit, where the coating comprises graphene. The coated surface of the hydroprocessing unit is then tested to determine whether the coating covers the entire surface of the hydroprocessing unit. Additional coating is then applied to one or more areas of the surface of the hydroprocessing unit that were determined not to be covered by the initial coating. In a further aspect, the coating is chemically or photochemically modified, whereby the graphene is stabilized and functionalized on the surface of the hydroprocessing unit.

In another aspect, the corrosion comprises one or more of: hydrogen embrittlement, high temperature hydrogen attack, temper embrittlement, high temperature $H_2S$ corrosion, polythionic acid cracking, and ammonium bisulfide corrosion.

In another aspect, the coating is applied to the surface of the hydroprocessing unit via a metallurgical process. In another aspect, the coating comprises a layer of graphene and a layer of cladding. In another aspect, the coating comprises a layer of graphene between two layers of cladding.

In another aspect, the surface of the hydroprocessing unit is a surface of one or more of a reactor, a compressor, a pump, a head, a nozzle, a joint, an internal, a separator, a drum, a heat exchanger, a water cooler, and an air cooler of the hydroprocessing unit.

In a third aspect, a hydroprocessing unit having increased lifespan and decreased susceptibility to corrosion is provided. The hydroprocessing unit comprises at least one component having one or more surfaces. The hydroprocessing unit also comprises a graphene-based coating applied to the one or more surfaces. The graphene-based coating comprises a first layer of graphene applied directly to the one or more surfaces and a second layer of clad material applied on top of the first layer of graphene. The graphene-based coating prevents corrosion on the one or more surfaces.

In another aspect of the hydroprocessing unit, the at least one component is selected from the group consisting of: a reactor, a compressor, a pump, a head, a nozzle, a joint, an internal, a pump, a compressor, a separator, a drum, a heat exchanger, a water cooler, and an air cooler. In a further aspect, the at least one component comprises a reactor and the reactor is configured to operate at a pressure in the range of 10 bar-250 bar.

In another aspect of the hydroprocessing unit, the at least one component comprises a reactor and the reactor is configured to operate at a temperature in the range of 36° C.-600° C.

In another aspect of the hydroprocessing unit, the one or more surfaces are metallic surfaces comprising a carbon steel or nickel steel or Cr—Mo alloy steel.

In another aspect of the hydroprocessing unit, the graphene layer is chemically or photo chemically modified such that graphene layer is stabilized and functionalized on the surface of the hydroprocessing unit.

In another aspect of the hydroprocessing unit, the corrosion comprises one or more of: hydrogen embrittlement, high temperature hydrogen attack, temper embrittlement, high temperature $H_2S$ corrosion, polythionic acid cracking, and ammonium bisulfide corrosion.

In another aspect of the hydroprocessing unit, the graphene-based coating is applied to the hydroprocessing unit via a metallurgical process.

BRIEF DESCRIPTION OF THE DRAWING FIGURES

FIG. 2 shows a table summarizing various metal alloys for use in hydroprocessing units and their relative costs in accordance with one or more embodiments.

DETAILED DESCRIPTION OF CERTAIN EMBODIMENTS IN ACCORDANCE WITH THE DISCLOSURE

Figure 1:
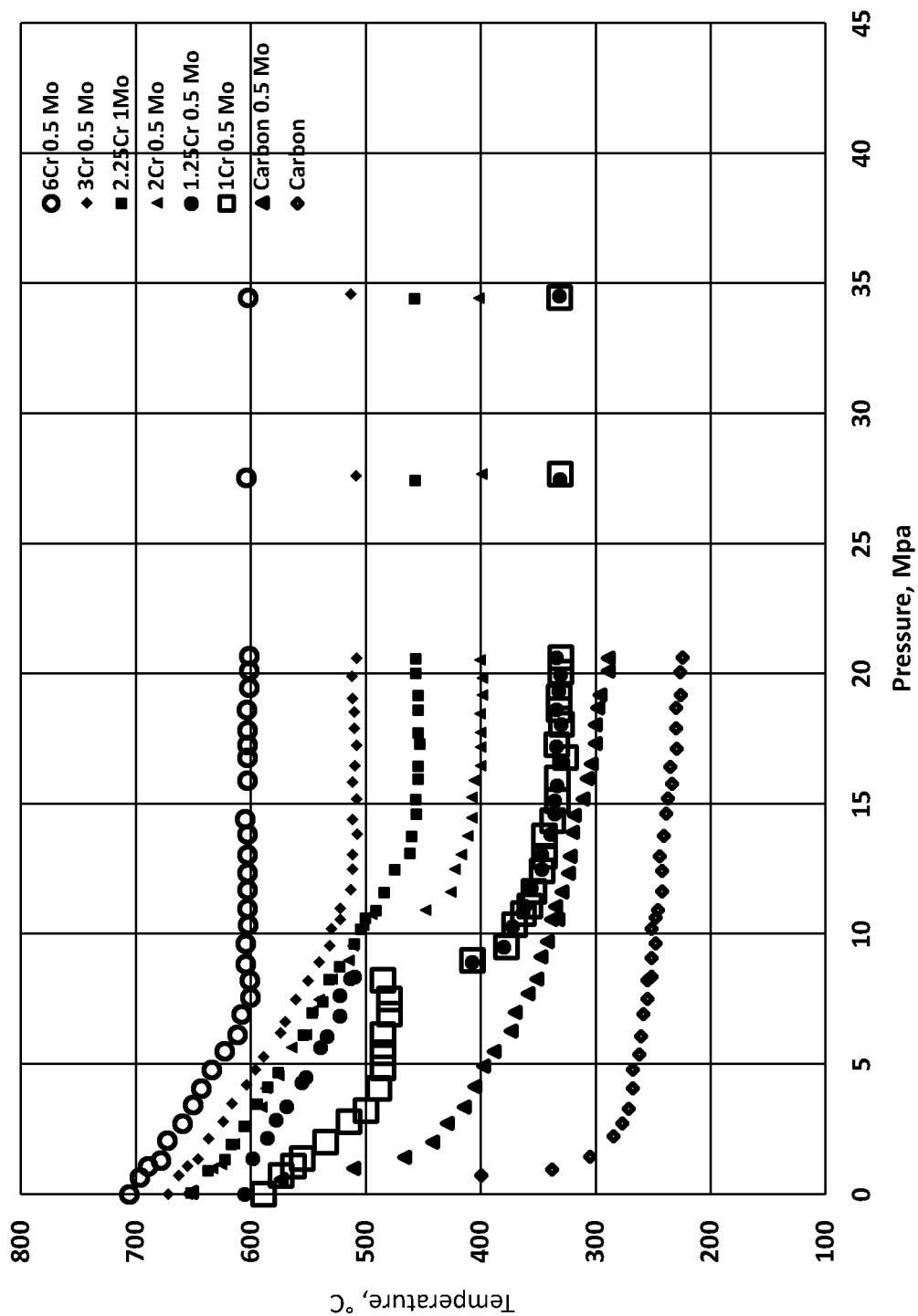
FIG. 1 shows a Nelson Curve (API941), which illustrates operating limits for various steels in hydroprocessing operations as a function of hydrogen partial pressure and temperature in accordance with one or more embodiments.

In accordance with one or more embodiments, the present application discloses improved hydroprocessing units and methods for a coating a surface of a hydroprocessing unit for preventing corrosion. More specifically, in one or more embodiments, the present application discloses methods for improving durability and preventing corrosion in hydroprocessing equipment, where the method includes applying a graphene-based coating to a surface of the hydroprocessing equipment. The graphene-based coating provides an enhanced protective layer to protect the metal surface of hydroprocessing equipment from corrosion. The graphene-based coating increases the lifespan and life cycle of the hydroprocessing equipment, resulting in fewer disruptions to the hydroprocessing operations, fewer equipment replacements, and thus increased savings. The graphene-based coating can be applied directly to the surface of the hydroprocessing equipment or over a cladding or weld overlay that is on the surface the equipment, for example. In one or more embodiments, the present application also discloses a method of operating a hydroprocessing reactor having a graphene-based coating applied to the surfaces of the reactor.

These and other aspects of the present hydroprocessing unit and methods are described in further detail below with reference to the accompanied drawing figures, in which one or more illustrated embodiments and/or arrangements of the methods are shown. The methods of the present application are not limited in any way to the illustrated embodiment and/or arrangement. It should be understood that the methods as shown in the accompanying figures are merely exemplary of the methods of the present application, which can be embodied in various forms as appreciated by one skilled in the art. Therefore, it is to be understood that any structural and functional details disclosed herein are not to be interpreted as limiting the present methods, but rather are provided as a representative embodiment and/or arrangement for teaching one skilled in the art one or more ways to implement the present methods.

There are several materials (e.g., metals, alloys) available for hydroprocessing equipment in refining applications, and selection of the particular materials for hydroprocessing units is based on the design parameters of the unit. Available materials for use in hydroprocessing equipment include but are not limited to carbon steel, carbon-molybdenum and chromium-molybdenum alloy steels, martensitic and ferritic chromium stainless steel, austenitic chromium-nickel stainless steels, and nickel alloy materials (e.g., nickel steel).

Carbon steel is used in the vast majority of refinery equipment, with the primary carbon steels in-use being structural steels, non-killed steels, and killed steels. The structural steels are often used for general refinery structure and equipment support. Minor non-pressure type tanks and drums can also be made using structural quality steels. These steels are manufactured with a minimum amount of quality control and testing. Killed steels are steels that are thoroughly deoxidized during the melting process. This results in a much cleaner steel, and thus it generally has more uniform and dependable properties. Deoxidation can be accomplished using silicon, manganese and aluminum additions to combine with and remove dissolved gases (e.g., oxygen) during the manufacturing. Non-killed steels, also referred to as rimmed steels, are used in most refinery applications where killed steel quality in not necessary.

Carbon-molybdenum (C—Mo) and chromium-molybdenum (Cr—Mo) alloy steels are used in hydroprocessing units when greater strength properties and improved corrosion resistance is required at both low and intermediate temperatures. For example, some hydroprocessing units utilize C-½ Mo and Cr—Mo alloys from 1 through 9W % Cr and ½ W % Mo. These alloys are used in applications where improved resistance to sulfur corrosion and hydrogen resistance is required. The C-½ Mo through the 2½ Cr-1Mo alloys are applied not only in hydrotreating and hydrocracking units but also in platforms where improved strength and resistance to high temperature hydrogen is required. Heater tubes of a hydroprocessing unit can also be fabricated from Cr—Mo alloys. A Nelson Curve (API941) is shown in FIG. 1, which illustrates operating limits for the various steels as a function of hydrogen partial pressure and temperature in accordance with one or more embodiments. These curves are based on plant experience rather than on thermodynamic or kinetic principles. FIG. 2 shows a table summarizing various metal alloys and their relative costs.

While several of the metal alloys of FIGS. 1 and 2 are conventionally used as a primary material for hydroprocessing units, these metal alloys are still susceptible to corrosion, and specifically, high-temperature hydrogen attack (hydrogen embrittlement), temper embrittlement, high-temperature $H_2S$ corrosion, polythionic acid cracking, and ammonium bisulfide corrosion. Accordingly, in accordance with one or more embodiments, the present application provides methods for preventing these types of corrosion by applying a graphene-based coating to a metallic (e.g., metal, metal alloy) surface of the hydroprocessing unit.

Figure 3:
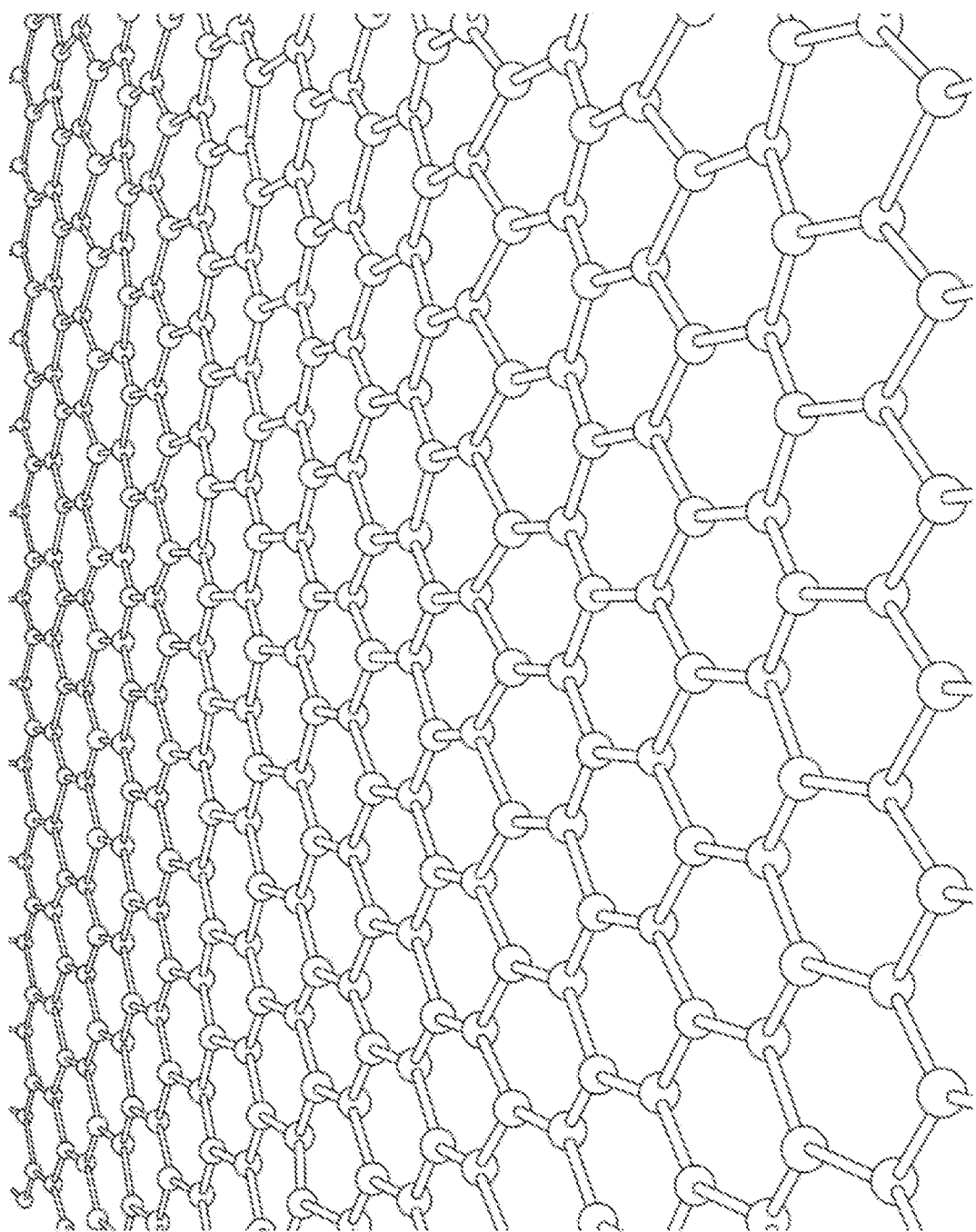
FIG. 3 shows an image of the honeycomb structure of graphene in accordance with one or more embodiments.

In one or more embodiments, the method can begin by applying a graphene coating to a surface of the hydroprocessing unit. Graphene has a structure of a honeycomb sheet of hexagonal rings of carbon atoms as shown in FIG. 3. Graphene is a durable, yet elastic material that has a Young's modulus (stiffness) of 1 TPa (150,000,000 psi) and an intrinsic tensile strength of 130 GPa (19,000,000 psi). As such, graphene is considered the strongest material ever measured. Graphene also has a high specific surface area of 2,630 $m^2/g$, high electron mobility, and is a good electrical conductor. With regard to the graphene-based coatings of the present application, a graphene sheet generally does not allow for the diffusion of small atoms. In other words, graphene is generally impermeable to even small atoms, such as hydrogen and helium, such that they cannot pass through a defect-free monolayer graphene sheet. As such, the graphene-based coatings of the present application can stand high temperatures and pressure and does not diffuse hydrogen, and is therefore effective at preventing corrosion, including hydrogen embrittlement.

In one or more embodiments, the graphene-based coating can be applied to one or more surfaces of the hydroprocessing unit via a metallurgical process. For example, graphene sheets can be produced by thermal decomposition of SiC at high temperature (e.g., 1300° C.) in a vacuum or in argon gas or by a confinement controlled sublimation growth method in accordance with one or more embodiments.

In at least one embodiment, the graphene-based coating can be applied to one or more surfaces of the hydroprocessing unit via a chemical vapor deposition process, such as an atmospheric pressure chemical vapor deposition process or a low pressure chemical vapor deposition process depending on the precursor materials. In particular, an atmospheric pressure chemical vapor deposition process can use a horizontal quartz tube that connects to a gas inlet and outlet. Alternatively, a low pressure chemical vapor deposition process can be used. Various methods for chemical vapor deposition of graphene are describe in Golap Kalita and Masaki Tanemura, Fundamentals of Chemical Vapor Deposited Graphene and Emerging Applications, May 2017.

In one or more embodiments, the graphene-based coating can be applied to a surface of one or more weld joints of the hydroprocessing unit. In one or more embodiments, the one or more surfaces on which the graphene-based coating is applied can include surfaces of one or more components or aspects of the hydroprocessing unit, including but not limited to reactors, heads, nozzles, joint, internals, separators, drums, heat exchangers (including a shell tube of the heat exchanger), water coolers, and air coolers of the hydroprocessing unit, as well as any other equipment of the hydroprocessing unit that is made with steel or metal.

Figure 4:
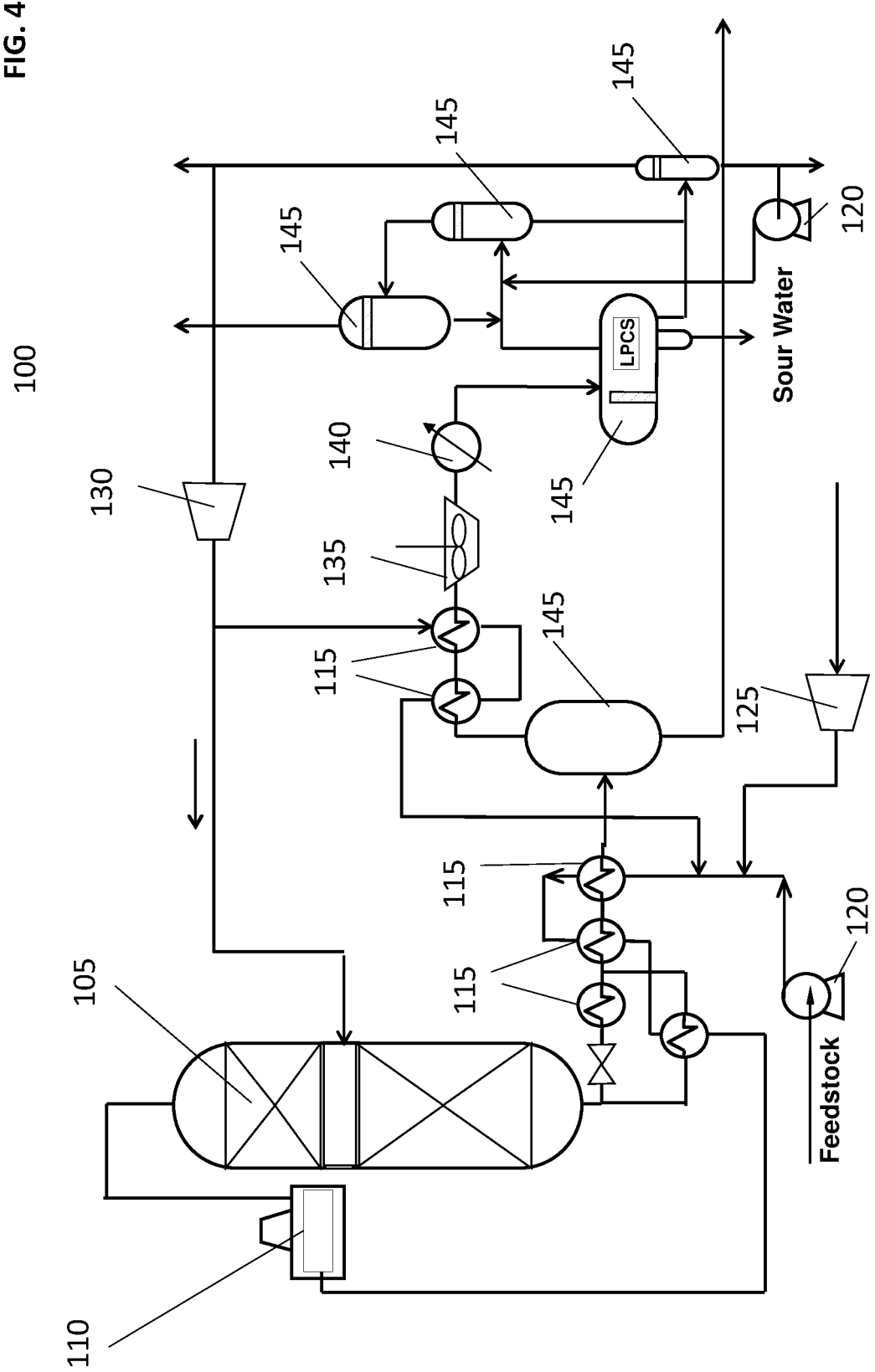
FIG. 4 shows a basic diagram of an exemplary hydroprocessing unit in accordance with one or more embodiments.

FIG. 4 shows a basic diagram of an exemplary hydroprocessing unit 100 in accordance with one or more embodiments. As exemplified in FIG. 4, the hydroprocessing unit 100 can include various components, including a hydrocracking reactor (hydrocracker) 105 operatively connected to a furnace 110. The hydroprocessing unit 100 can also include one or more heat exchangers 115, one or more pumps 120, a make-up compressor 125 and a recycle compressor 130. The hydroprocessing unit 100 can further include an air cooler 135, a water cooler 140, and one or more separation vessels 145. In one or more embodiments, the hydroprocessing unit 100 can include one or more additionally features or aspects, including but not limited to heads, nozzles, joint, internals, and drums (not shown). In one or more embodiments, the graphene-based coating can be applied to one or more surfaces of any of the aforementioned components, features, and aspects of the hydroprocessing unit 100 or any other equipment of the hydroprocessing unit 100 that is made with steel or metal.

In one or more embodiments, the surface of the hydroprocessing unit can be a metallic surface. As discussed above, the hydroprocessing unit can comprise several materials (e.g., metals, alloys) as listed in FIGS. 1 and 2. As such, a surface of the hydroprocessing unit that is coated with the graphene-based coating can comprise one or more of the metals or alloys of FIGS. 1 and 2 or other metals or alloys that are appropriate for use in hydroprocessing units as would be understood in the art. For example, in at least one embodiment, the metallic surface of the hydroprocessing unit can comprise a Cr—Mo alloy steel.

In one or more embodiments, the graphene-based coating can be chemically or photochemically modified such that the graphene is stabilized and functionalized on the surface of the hydroprocessing unit. For example, the graphene can be modified using a wet-chemical method, which covalently attaches organic moieties onto the surface of the graphene. Chemical modification and functionalization on the surface of the graphene can be performed in numerous ways, including via techniques disclosed in Koehler et al, Selective Chemical Modification of Graphene surfaces: Distinction between Single and Bilayer Graphene, Small. 2010.

In at least one embodiment, the graphene-based coating can be applied to a surface of a hydroprocessing reactor. Hydroprocessing reactors are generally high-pressure vessels in hydrogen service. In one or more embodiments, the hydroprocessing reactor is operating at pressures in the range of 10 bar-250 bar. In one or more embodiments, the hydroprocessing reactor is operated at temperatures in the range of 36° C.-600° C.

In one or more embodiments, the graphene-based coating can be applied on a cladding (clad material) or a weld overlay of the surface of the hydroprocessing unit. In general, a cladding or weld overlay refer to a metal-based covering of a surface of the hydroprocessing unit. The cladding (clad material) or weld overlay is applied to the metal surface via a welding process where one or more metals with specific characteristics are applied to a base metal of the surface to improve desirable properties or to restore the original dimension of the component of the hydroprocessing unit. For example, the cladding can comprise one or more of type 309, type 316, and type 347 stainless steel. As such, in one more embodiments, the graphene-based coating is applied on top of the cladding or weld overlay.

In one or more embodiments, the graphene-based coating can be applied between two layers of cladding. In other words, a first cladding layer can cover the surface of the hydroprocessing unit, the graphene-based coating can be applied on the first cladding layer, and then a second cladding layer can be applied on graphene-based coating such that the graphene-based coating it situated between two cladding layers.

Figure 5B:
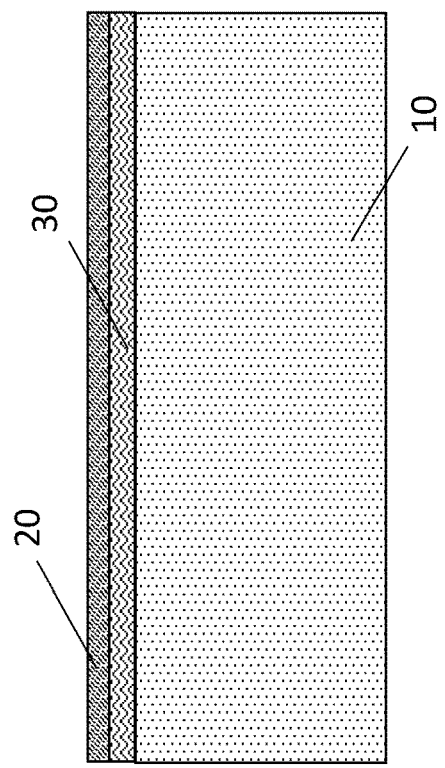
FIGS. 5A-5B show diagrams illustrating graphene-cladding "double coating" on a surface of a hydroprocessing unit in accordance with one or more embodiments.
Figure 5A:
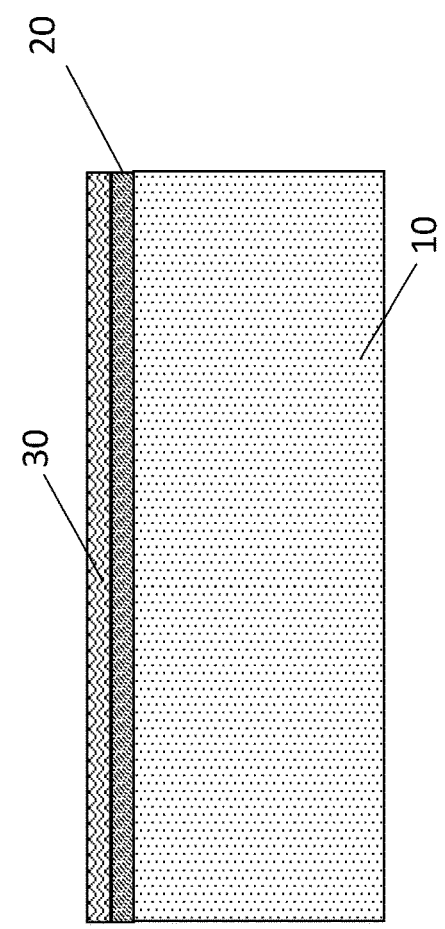

In at least one embodiment, the graphene-based coating can be applied between the surface of the hydroprocessing unit and a cladding. In other words, the graphene-based coating can be applied directly on a surface of the hydroprocessing unit and a cladding can be applied on top of the graphene-coating. Thus, in one or more embodiments, a "double coating" comprising a) a cladding (clad material) layer applied directly on the surface of the hydroprocessing unit and b) a graphene layer applied on top of the cladding layer. Conversely, in at least one embodiment, a double coating can comprise a) a graphene layer applied directly on the surface of the hydroprocessing unit and b) a cladding (clad material) layer applied on top of the cladding layer. FIGS. 5A-5B show diagrams illustrating exemplary graphene-cladding "double coating" on the surface of a hydroprocessing unit in accordance with one or more embodiments. As shown in FIG. 5A, in one or more embodiments the surface 10 of the hydroprocessing unit can have a cladding layer 20 applied directly onto it and a graphene layer 30 applied on top of the cladding layer 20. Conversely, as shown in FIG. 5B, in one or more embodiments the surface 10 of the hydroprocessing unit can have a graphene layer 30 applied directly onto it and a cladding layer 20 applied on top of the graphene layer 30. In one or more embodiments in which there is a double coating of cladding and graphene, the cladding and the graphene are applied in separate steps.

Once the graphene-based coating (or coating comprising graphene and cladding) has been applied to the at least one surface of the hydroprocessing unit, the coated surface(s) can be tested to determine whether the coating covers the entire surface or whether one or more gaps in the coating on the surface are detected. In one or more embodiments, the coating can be tested visually via a camera or other visual recording device, for example. In one or more embodiments, the coating can be tested using one or more other test techniques, such as transmission electron microscopy (TEM), energy dispersive x-ray analysis (EDX), Raman spectroscopy, x-ray photoelectron spectroscopy (XPS), or inductively coupled plasma optical emission spectroscopy (ICP-OES).

If the testing step determines that one more gaps in the coating are present on the coated surfaces, then an additional coating is applied to the surface(s) of the hydroprocessing unit at the one or more areas of the surface of the weld joint that were determined not to be fully covered by the initial coating of graphene. In at least one embodiment, the testing step can be repeated after the application of the additional coating to verify that the additional coating has filled in all gaps in the initial coating. Both the steps of testing the coating and applying additional coating can be repeated until it is verified (e.g., via visual testing) that the coating of the one or more surfaces is complete.

As described herein, the hydroprocessing unit can refer to one or more aspects or components of a hydroprocessing operation including a hydroprocessing reactor. In accordance with one or more embodiments, there are two main types of reactors used in hydroprocessing: 1) a clad-type reactor comprising clad material and SA240 Type 347/Type 304 stainless steel, and 2) a weld overlay type reactor comprising weld overlay material with a double layer of SS 309L+SS347/308L stainless steel or a single layer SS347 stainless steel. A typical clad or weld overlay for such a reactor is 3 mm in thickness. Hydroprocessing reactors can have one or more surfaces that are exposed to corrosive materials and fluids as discussed in further detail below.

Process severity in a hydroprocessing unit increases with increasing feedstock heaviness and also depending on the type of service. For example, hydrotreatment of naphtha (hydrocarbons boiling in the range of 36–180° C.) requires as low as 10 bars of pressure and a temperature of 300° C. In contrast, hydrocracking of vacuum residue (hydrocarbons boiling above 520° C.) requires at high as 250 bars of pressure and a temperature of 450° C. of temperature. In conventional hydroprocessing systems, high pressures and relatively high temperatures require the use of heavy wall reactors and vessels having thick and heavy walls. For example, in certain conventional hydroprocessing units, the thickness of the hydroprocessing reactor is in excess of 355 mm (approximately 14 inches).

However, the present methods, and the inclusion of a graphene-based coating on the surface of the hydroprocessing unit as disclosed in the present application, has an additional benefit of allowing for reduced thickness in the hydroprocessing units (e.g., hydroprocessing reactor). Specifically, the strength of the graphene-based coating and the ability of the graphene-based coating to prevent various types of corrosion allows for a reduction in the thickness of the walls of the components of the hydroprocessing unit. For example, in conventional hydroprocessing reactors, the thickness of the reactor wall is approximately 10-14 inches. However, the inclusion of the graphene-based coating on the surface of the reactor wall allows for a significant reduction in the thickness of the reactor wall, which results in substantial cost savings during production. For example, in one or more embodiments, the reduction in the thickness of the reactor wall is 10 inches or less. In certain embodiments, the reduction in the thickness of the reactor wall is 7 inches or less. In at least one embodiment, the reduction in the thickness of the reactor wall is 5 inches or less. As such, the inclusion of a graphene-based coating on a thinner component of the hydroprocessing unit reduces the overall weight of the hydroprocessing equipment, and in particular, the weight of the reactor, compressors, and other primary vessels of the hydroprocessing unit.

The graphene-based coating and combined coatings of graphene and cladding (e.g., "double coating") provide effective protection against various types of hydrogen- and sulfur-based corrosion. In hydroprocessing operations, hydrogen is added to the hydrocarbon molecules by removing the heteroatoms such as sulfur and nitrogen and/or by hydrogenation of aromatic compounds. As a result of hydrodesulfurization and hydrodenitrogenation (HDN), hydrogen sulfide and ammonia are released and the hydroprocessing reactor effluents are rich in hydrogen sulfide and ammonia. When the hydroprocessing reactor effluents are cooled ammonia and hydrogen sulfide forms ammonium bisulfide. Water is therefore added to the stream to prevent ammonium bisulfide deposition in the system. The hydrocracking reactor effluents contain large amounts of hydrogen, and often appreciable amounts of hydrogen sulfide and ammonium bisulfide that can cause materials degradation and corrosion.

The presence of hydrogen at high pressures and temperatures creates a potential environment for corrosion (e.g., hydrogen disbonding and cracking). The situation is aggravated by the presence of highly corrosive hydrogen sulfide in the hydroprocessing units. Hydroprocessing reactors are prone to corrosion under high hydrogen and hydrogen sulfide pressures.

The followings corrosion types are common in hydroprocessing reactors: high-temperature hydrogen attack (HTHA) or hydrogen embrittlement; temper embrittlement; high-temperature hydrogen sulfide ($H_2S$) corrosion; polythionic acid cracking; and ammonium bisulfide corrosion. HTHA is a phenomenon in which atomic hydrogen diffuses into a steel matrix ("hydrogen diffusion") of a hydroprocessing unit, reacts with iron carbide, and forms methane. The loss of carbon results in a degradation of the steel's mechanical properties. In addition, the formed methane gas exerts pressure, resulting in internal blistering and cracking. Chromium is an alloying element that improves the resistance of ferrous alloys to HTHA. However, chromium-based alloys are still susceptible to other types of corrosion, such as temper embrittlement.

Temper embrittlement is a significant metallurgical problem related to the use of 2¼ Cr and 3 Cr steels in hydroprocessing reactors. Temper embrittlement is defined as brittleness that results when susceptible alloys such as 2¼ Cr and 3 Cr steels are held within or cooled through a temperature range of about 343-538° C. The degree of embrittlement is manifested by an increase in the ductile-to-brittle fracture transition temperature. Another disadvantage of 2¼ Cr or 3 Cr materials is their low resistance to high-temperature $H_2S$ corrosion. For example, at 426° C. and 0.2 mole percent $H_2S$, the estimated corrosion rate of 2¼ Cr steel is 2 mm/year. At this rate, a reactor with a typical corrosion allowance of 3 mm will only last 1.5 years.

Other metallic options for hydroprocessing units, including 300 series stainless steels, can have a higher resistance to high-temperature $H_2S$ corrosion, but yet are susceptible to polythionic acid cracking. Specifically, 300 series stainless steels become sensitized if they are exposed to a temperature range of 360° C.-700° C. When sensitized, chromium carbides precipitate in the grain boundaries creating chromium depleted zones adjacent to the grain boundaries. These chromium lean areas are then preferentially attacked by polythionic acid. The attack can be in the form of heavy grain boundary corrosion or in the form of intergranular cracking. Polythionic acid is formed when iron sulfide scale is exposed to moisture and oxygen. Formation of polythionic acid generally occurs during shutdown of the hydroprocessing unit.

Finally, reactor effluent piping and reactor effluent condensers of a hydroprocessing unit are especially susceptible to corrosion, and in particular, ammonium bisulfide corrosion. As a process stream cools in the hydroprocessing unit, ammonia and $H_2S$ react to form ammonium bisulfide crystals. To keep these crystals from depositing on tube surfaces it is necessary to inject water upstream of the air cooler. This ammonium bisulfide solution formed by the water injection is corrosive to carbon steel. Further, the higher the concentration of ammonium bisulfide and its velocity, the higher the corrosion rate.

In one or more embodiments of the present application, a method of operating a hydroprocessing reactor is provided. As mentioned above the hydroprocessing reactor can comprises one or more surfaces that are exposed to corrosive compounds, which can cause various types of corrosion, such as hydrogen embrittlement, high temperature hydrogen attack, temper embrittlement, high temperature $H_2S$ corrosion, polythionic acid cracking, and ammonium bisulfide corrosion.

In the method, a graphene-based coating is first applied to the surfaces of the hydroprocessing reactor. A crude oil or its fractions feed can then be introduced into the hydroprocessing reactor for subsequent hydrotreatment and hydroconversion. In one or more embodiments, the operating temperature of the reactor can be increased to a temperature in the range of 36° C.-600° C. In one or more embodiments, the operating pressure of the reactor can be in the range of 10 bar-250 bar. The crude oil or its fractions feed in the reactor is then hydroprocessed. However, the graphene-based coating defines a barrier on the surfaces of the reactor such that corrosion in the reactor is prevented.

In at least one embodiment of the method of operating a hydroprocessing reactor, the graphene-base coating is chemically or photochemically modified such that the graphene-based coating is stabilized and functionalized on the surfaces of the reactor. In one or more embodiments, the graphene-based coating is applied to the surfaces of the reactor via a metallurgical process as discussed above. Additionally, in one or more embodiments, the graphene-based coating can comprise a layer of graphene and a layer of cladding (double coating). In at least one embodiments, the graphene-based coating can comprise a layer of graphene between two layers of cladding.

The graphene-based coatings of the present application counteract the various types of corrosion described above and thus prolong the lifespan or life cycle of the various components of the hydroprocessing unit. Further, due to improved corrosion protection provided by the graphene-based coatings, the thickness of the metal components of the hydroprocessing unit can be drastically reduced, thereby providing cost-savings in the production of the hydroprocessing unit components. Implementation of the present graphene-based coatings and the methods of the present application provide lasting improvements to the operation of hydrotreating and hydrocracking units and reduce the amount of materials used in the fabrication of such units.

Although much of the foregoing description has been directed to improved hydroprocessing units and methods for preventing corrosion in a hydroprocessing unit, the apparatuses and methods disclosed herein can be similarly deployed and/or implemented in scenarios, situations, and settings far beyond the referenced scenarios. It should be further understood that any such implementation and/or deployment is within the scope of the methods and apparatuses described herein.

It is to be further understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s) (including the contents of the documents cited and incorporated by reference herein), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings are shown accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method of operating a hydroprocessing reactor, the reactor comprising surfaces exposed to corrosive compounds, the method comprising:
    applying a graphene-based coating to the surfaces of the reactor;
    introducing a feed comprising crude oil or its fractions and hydrogen into the reactor;
    increasing an operating temperature of the reactor to a temperature in the range of 36° C.-600° C.;
    operating the reactor in a pressure range of 10 bar-250 bar; and
    hydroprocessing the feed in the reactor, wherein the graphene-based coating defines a barrier on the surfaces of the reactor that prevents corrosion wherein the graphene-based coating comprises a layer of graphene and a layer of cladding.

2. The method of claim 1, further comprising:
    chemically or photochemically modifying the graphene-base coating, such that the graphene-based coating is stabilized and functionalized on the surfaces of the reactor.

3. The method of claim 1, wherein the corrosion comprises one or more of: hydrogen embrittlement, high temperature hydrogen attack, temper embrittlement, high temperature $H_2S$ corrosion, polythionic acid cracking, and ammonium bisulfide corrosion.

4. The method of claim 1, wherein the graphene-based coating is applied to the surfaces of the reactor via a metallurgical process.

5. A method for preventing corrosion in a hydroprocessing unit, comprising:
    applying a coating to a surface of the hydroprocessing unit, wherein the coating comprises graphene;
    testing the coated surface of the hydroprocessing unit to determine whether the coating covers the entire surface of the hydroprocessing unit;
    applying additional coating to one or more areas of the surface of the hydroprocessing unit that were determined not to be covered by the initial coating wherein the graphene-based coating comprises a layer of graphene and a layer of cladding.

6. The method of claim 5, further comprising the step of chemically or photochemically modifying the coating, whereby the graphene is stabilized and functionalized on the surface of the hydroprocessing unit.

7. The method of claim 5, wherein the corrosion comprises one or more of: hydrogen embrittlement, high temperature hydrogen attack, temper embrittlement, high temperature $H_2S$ corrosion, polythionic acid cracking, and ammonium bisulfide corrosion.

8. The method of claim 5, wherein the coating is applied to the surface of the hydroprocessing unit via a metallurgical process.

9. The method of claim 5, wherein the coating comprises a layer of graphene between two layers of cladding.

10. The method of claim 5, wherein the surface of the hydroprocessing unit is a surface of one or more of a reactor, a compressor, a pump, a head, a nozzle, a joint, an internal, a separator, a drum, a heat exchanger, a water cooler, and an air cooler of the hydroprocessing unit.

11. A hydroprocessing unit having increased lifespan and decreased susceptibility to corrosion, comprising:
    at least one component having one or more surfaces; and
    a graphene-based coating applied to the one or more surfaces, wherein the graphene-based coating comprises a first layer of graphene applied directly to the one or more surfaces and a second layer of clad material applied on top of the first layer of graphene; and
    wherein the graphene-based coating prevents corrosion on the one or more surfaces.

12. The hydroprocessing unit of claim 11, wherein the at least one component is selected from the group consisting of: a reactor, a compressor, a pump, a head, a nozzle, a joint, an internal, a separator, a drum, a heat exchanger, a water cooler, and an air cooler.

13. The hydroprocessing unit of claim 12, wherein the at least one component comprises a reactor and the reactor is configured to operate at a pressure in the range of 10 bar-250 bar.

14. The hydroprocessing unit of claim 12, wherein the at least one component comprises a reactor and the reactor is configured to operate at a temperature in the range of 36° C.-600° C.

15. The hydroprocessing unit of claim 11, wherein the one or more surfaces are metallic surfaces comprising a carbon steel or nickel steel or Cr—Mo alloy steel.

16. The hydroprocessing unit of claim 11, wherein the graphene layer is chemically or photo chemically modified such that graphene layer is stabilized and functionalized on the surface of the hydroprocessing unit.

17. The hydroprocessing unit of claim 11, wherein the corrosion comprises one or more of: hydrogen embrittlement, high temperature hydrogen attack, temper embrittlement, high temperature $H_2S$ corrosion, polythionic acid cracking, and ammonium bisulfide corrosion.

18. The hydroprocessing unit of claim 11, wherein the graphene-based coating is applied to the hydroprocessing unit via a metallurgical process.

* * * * *